United States Patent
Ye

(10) Patent No.: US 10,194,456 B2
(45) Date of Patent: Jan. 29, 2019

(54) DEVICE AND METHOD OF HANDLING DATA TRANSMISSION IN UNLICENSED BAND

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 109 days.

(21) Appl. No.: 15/086,087

(22) Filed: Mar. 31, 2016

(65) Prior Publication Data

US 2016/0295606 A1 Oct. 6, 2016

Related U.S. Application Data

(60) Provisional application No. 62/141,796, filed on Apr. 1, 2015.

(51) Int. Cl.
*H04W 72/12* (2009.01)
*H04W 16/14* (2009.01)
(Continued)

(52) U.S. Cl.
CPC ....... *H04W 72/1268* (2013.01); *H04W 16/14* (2013.01); *H04W 72/12* (2013.01);
(Continued)

(58) Field of Classification Search
None
See application file for complete search history.

(56) References Cited

U.S. PATENT DOCUMENTS

2008/0085681 A1* 4/2008 Wang .................. H04B 7/0408
455/72
2008/0165742 A1* 7/2008 Marinier .............. H04W 72/14
370/332
(Continued)

FOREIGN PATENT DOCUMENTS

TW 201345298 A 11/2013
TW 201345299 A 11/2013
(Continued)

OTHER PUBLICATIONS

3GPP TR 36.889 V0.3.1 (Feb. 2015) Technical Report 3rd Generation Partnership Project; Technical Specification Group Radio Access Network; Study on Licensed-Assisted Access to Unlicensed Spectrum; (Release 13).
(Continued)

*Primary Examiner* — Xavier Szewai Wong
(74) *Attorney, Agent, or Firm* — Winston Hsu

(57) ABSTRACT

A communication device for handling data transmission in an unlicensed band comprises a storage unit for storing instructions and a processing means coupled to the storage unit. The processing means is configured to execute the instructions stored in the storage unit. The instructions comprise receiving an uplink (UL) grant in the unlicensed band from a network, wherein the UL grant indicates a first plurality of resource blocks for transmitting data; transmitting the data in the first plurality of resource blocks of the unlicensed band to the network according to the UL grant; and transmitting a preamble in a second plurality of resource blocks of the unlicensed band to the network, wherein the preamble indicates the transmission of the data.

13 Claims, 5 Drawing Sheets

(51) Int. Cl.
*H04W 72/14* (2009.01)
*H04W 72/04* (2009.01)

(52) U.S. Cl.
CPC ....... *H04W 72/1226* (2013.01); *H04W 72/14* (2013.01); *H04W 72/0413* (2013.01)

(56) References Cited

U.S. PATENT DOCUMENTS

| | | | |
|---|---|---|---|
| 2013/0157670 A1 | 6/2013 | Koskela | |
| 2013/0165134 A1* | 6/2013 | Touag | H04W 72/0486 455/452.1 |
| 2013/0294356 A1 | 11/2013 | Bala | |
| 2015/0023315 A1 | 1/2015 | Yerramalli | |
| 2015/0085797 A1 | 3/2015 | Ji | |
| 2016/0233989 A1* | 8/2016 | Belghoul | H04L 1/1887 |
| 2016/0278050 A1* | 9/2016 | Nory | H04W 16/14 |
| 2017/0034819 A1* | 2/2017 | Wang | H04L 5/1469 |
| 2017/0078107 A1* | 3/2017 | Itagaki | H04L 1/18 |
| 2017/0118728 A1* | 4/2017 | Harada | H04W 52/38 |

FOREIGN PATENT DOCUMENTS

| | | |
|---|---|---|
| TW | 201404222 A | 1/2014 |
| WO | 2015184216 A1 | 12/2015 |
| WO | 2016021979 A1 | 2/2016 |

OTHER PUBLICATIONS

Search Report dated Aug. 10, 2016 for EP application No. 16163211.2, pp. 1~11.

NTT DOCOMO, "Views on issues related to LAA UL", 3GPP TSG RAN WG1 Meeting #79, R1-144970, Nov. 17-21, 2014, San Francisco, USA, XP050876017, pp. 1-4.

Catt, "Data and control signaling transmission for LAA", 3GPP TSG RAN WG1 Meeting #80, R1-150113, Feb. 9-13, 2015, Athens, Greece, XP050933327, pp. 1-3.

Huawei, HiSilicon, "Analysis of the Impact of Discontinuous Transmission on User Plane in LAA", 3GPP TSG-RAN WG2 Meeting #89, R2-150244, Feb. 9-13, 2015, Athens, Greece, XP050935570, pp. 1-4.

Office action dated Apr. 12, 2018 for the Taiwan application No. 105110449, filing date Apr. 1, 2016, p. 1~3.

* cited by examiner

DEVICE AND METHOD OF HANDLING DATA TRANSMISSION IN UNLICENSED BAND

CROSS REFERENCE TO RELATED APPLICATIONS

This application claims the benefit of U.S. Provisional Application No. 62/141,796, filed on Apr. 1, 2015, which is incorporated herein by reference.

BACKGROUND OF THE INVENTION

1. Field of the Invention

The present invention relates to a communication device and a method used in a wireless communication system, and more particularly, to a communication device and method of handling data transmission in an unlicensed band in a wireless communication system.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3GPP Rel-10 standard or later versions.

Network operators propose to offload network traffic of the LTE/LTE-A system to an unlicensed band, to ease load of the network traffic. For example, the eNB may provide (e.g., allocate, assign) services to the UE via the unlicensed band. However, resource (e.g., service) provided by the eNB may not be available due to listen before talk (LBT) in the unlicensed band. In this situation, the UE is not able to perform a transmission (e.g., data transmission) via the resource. Correspondingly, the eNB is unaware of whether the transmission is performed. An error may occur, if the UE does not perform the transmission due to the LBT and the eNB proceeds to perform a hybrid automatic repeat request (HARQ) process corresponding to the transmission. That is, the eNB treats the transmission as being incorrect rather than not being performed. As a result, not only the performance of the HARQ process is degraded, but the benefit of the usage of the unlicensed band is also diminished.

Thus, how to handle the transmission in the unlicensed band is an important problem to be solved.

SUMMARY OF THE INVENTION

The present invention therefore provides a method and related communication device for handling a data transmission in an unlicensed band to solve the abovementioned problem.

A communication device for handling data transmission in an unlicensed band comprises a storage unit for storing instructions and a processing means coupled to the storage unit. The processing means is configured to execute the instructions stored in the storage unit. The instructions comprise receiving an uplink (UL) grant in the unlicensed band from a network, wherein the UL grant indicates a first plurality of resource blocks for transmitting data; transmitting the data in the first plurality of resource blocks of the unlicensed band to the network according to the UL grant; and transmitting a preamble in a second plurality of resource blocks of the unlicensed band to the network, wherein the preamble indicates the transmission of the data.

A network for handling data transmission in an unlicensed band comprises a storage unit for storing instructions and a processing means coupled to the storage unit. The processing means is configured to execute the instructions stored in the storage unit. The instructions comprise transmitting an uplink (UL) grant in the unlicensed band to a communication device for indicating the communication device to transmit data; and performing a hybrid automatic repeat request (HARQ) process corresponding to the data with the communication device, after receiving a preamble indicating the transmission of the data from the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
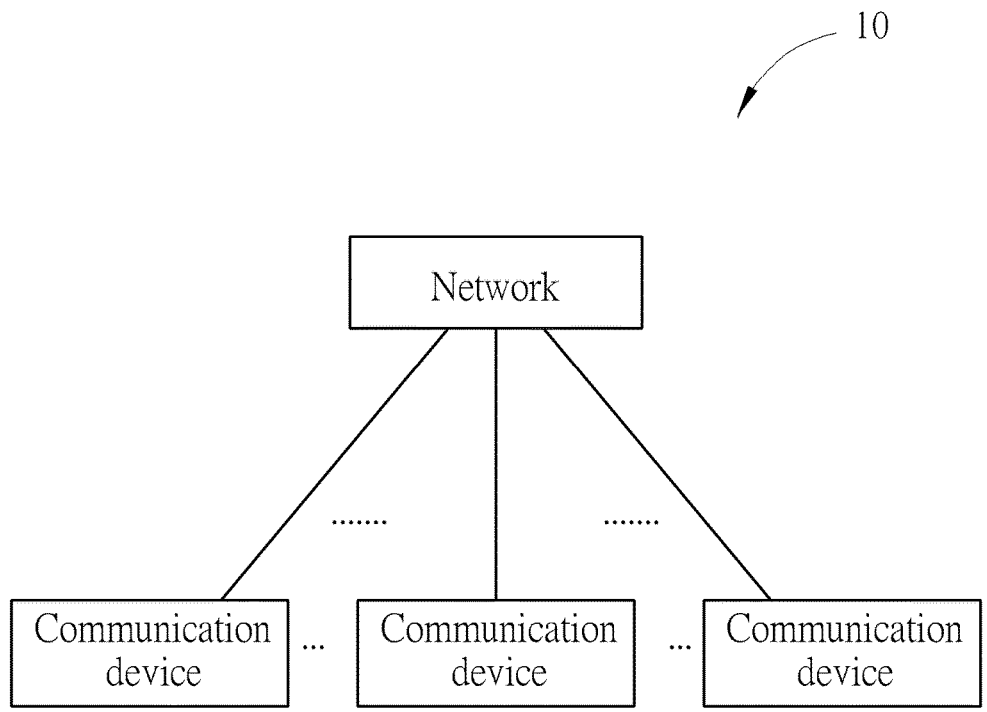
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band (s) and/or unlicensed band (s). The network and the communication device may simultaneously communicate with each other via multiple cells (e.g., multiple carriers) including a primary cell (e.g., primary component carrier) and one or more secondary cells (e.g., secondary component carriers). The abovementioned cells may be operated in the same or different duplexing modes, i.e., frequency-division duplexing (FDD) and time-division duplexing (TDD). For example, the primary cell may be operated on licensed carrier (s), while the secondary cell may be operated on unlicensed carrier (s).

In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
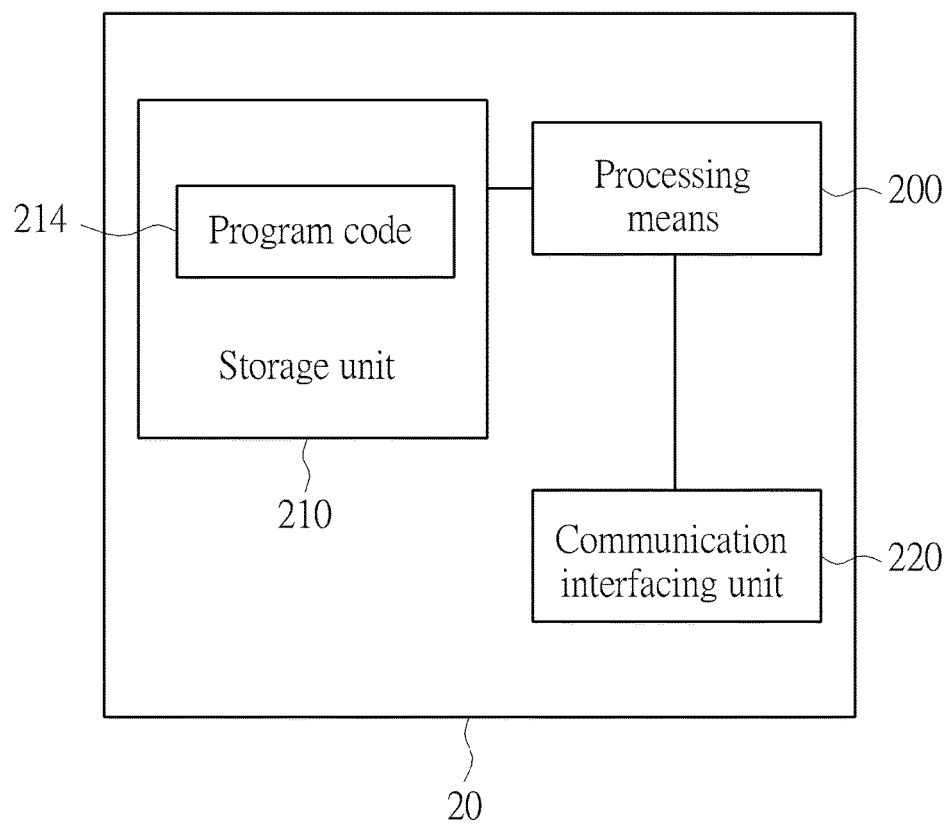
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

Figure 3:
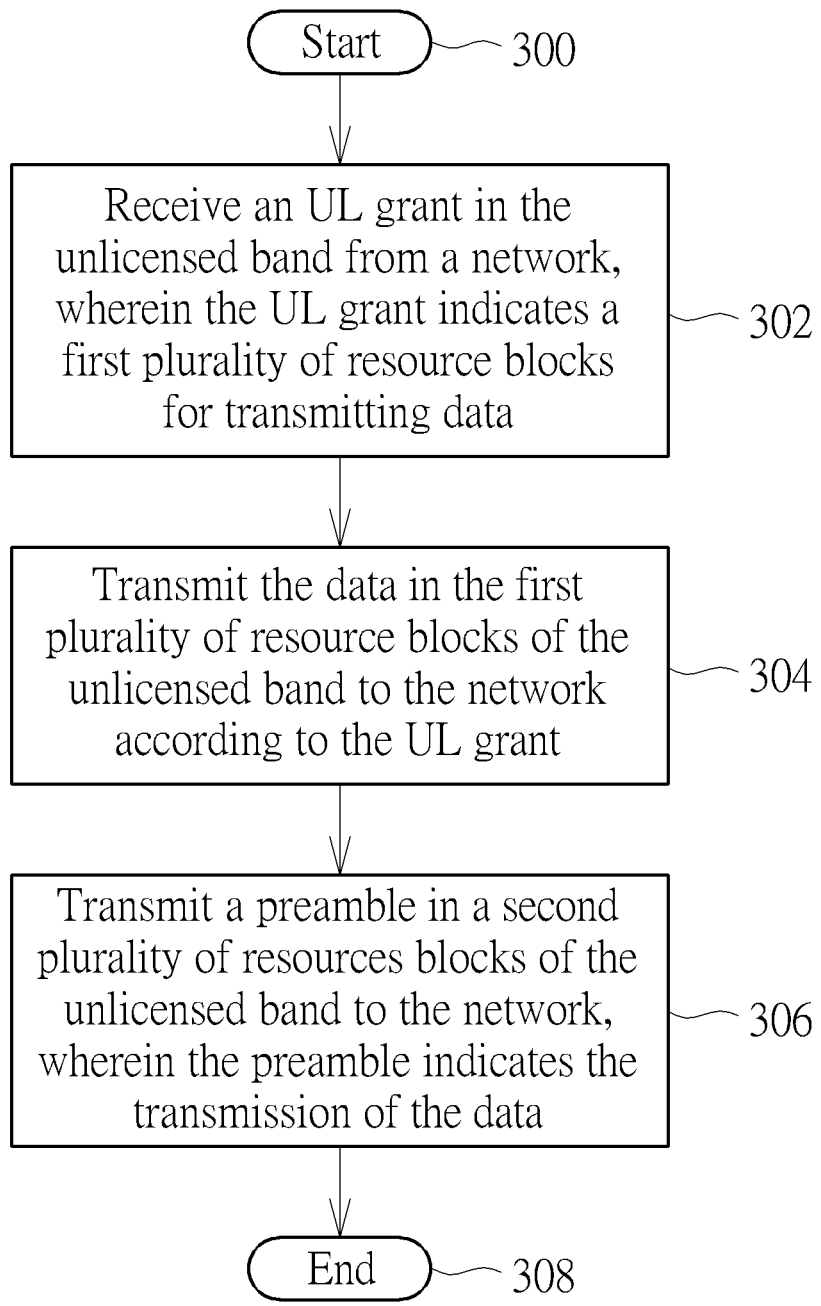
FIG. 3 is a flowchart of a process according to an example of the present invention.

FIG. 3 is a flowchart of a process 30 according to an example of the present invention. The process 30 may be utilized in a communication device shown in FIG. 1, to handle data transmission in an unlicensed band. The process 30 may be compiled into the program code 214 and includes the following steps:

Step 300: Start.

Step 302: Receive an UL grant in the unlicensed band from a network, wherein the UL grant indicates a first plurality of resource blocks for transmitting data.

Step 304: Transmit the data in the first plurality of resource blocks of the unlicensed band to the network according to the UL grant.

Step 306: Transmit a preamble in a second plurality of resource blocks of the unlicensed band to the network, wherein the preamble indicates the transmission of the data.

Step 308: End.

According to the process 30, the communication device may receive an UL grant (e.g., for allocation of resource (time and/or frequency), modulation and coding scheme (MCS), etc.) in the unlicensed band from a network, wherein the UL grant indicates a first plurality of resource blocks for transmitting data. Then, the communication device may transmit the data in the first plurality of resource blocks of the unlicensed band to the network according to the UL grant, and may transmit a preamble in a second plurality of resource blocks of the unlicensed band to the network, wherein the preamble indicates the transmission of the data. That is, the communication device not only transmits the data to the network, but also transmits the preamble for indicating the transmission of the data to the network. In other words, the network may know (e.g., determine) that the data has been transmitted by the communication device, if the preamble is received (e.g., detected). Thus, the problem that the network is unaware of the transmission of the data from the communication device in the unlicensed band is solved. The network may perform a hybrid automatic repeat request (HARQ) process corresponding to the data, if both the data and the preamble are received. As a result, performance of the HARQ process can be improved, and the benefit of the usage of the unlicensed band can be maintained.

Realization of the process 30 is not limited to the above description.

There are various ways for determining the second plurality of resource blocks. In one example, the second plurality of resource blocks may be configured by a radio resource control (RRC) message transmitted by the network. In one example, the second plurality of resource blocks may be predetermined in the communication device. In one example, the second plurality of resource blocks may be determined according to the UL grant. Further, the second plurality of resource blocks may be determined according to an index of a resource block for receiving the UL grant. In another example, the second plurality of resource blocks may be determined according to a field of the UL grant.

In one example, the second plurality of resource blocks may be a part of the first plurality of resource blocks. For example, the second plurality of resource blocks may be the first n resource blocks of the first plurality of resource blocks, wherein n is a positive integer. In one example, the second plurality of resource blocks may not be overlapped with (i.e., separated from) the first plurality of resource blocks. For example, the second plurality of resource blocks may be in a resource pool, wherein the resource pool may be determined (e.g., allocated) by the network and may not be overlapped with the first plurality of resource blocks.

In one example, the preamble may be multiplied by an orthogonal sequence by the network. Accordingly, a plurality of preambles may be transmitted via the same resources (e.g., time resources and/or frequency resources).

In one example, the preamble may further indicate at least one of a channel quality of the unlicensed band and a traffic load of the unlicensed band. It should be noted that the channel quality may include (or simply be) channel quality indicator (CQI), reference signal received power (RSRP), reference signal received quality (RSRQ) and/or received signal strength indicator (RSSI), etc., and is not limited herein.

In one example, the communication device may select the preamble from a plurality of predetermined preambles according to the at least one of the UL grant, the channel quality of the unlicensed band and the traffic load of the unlicensed band. Further, the preamble may be selected according to an index of a resource block for receiving the UL grant, or is selected according to a field of the UL grant.

Figure 4:
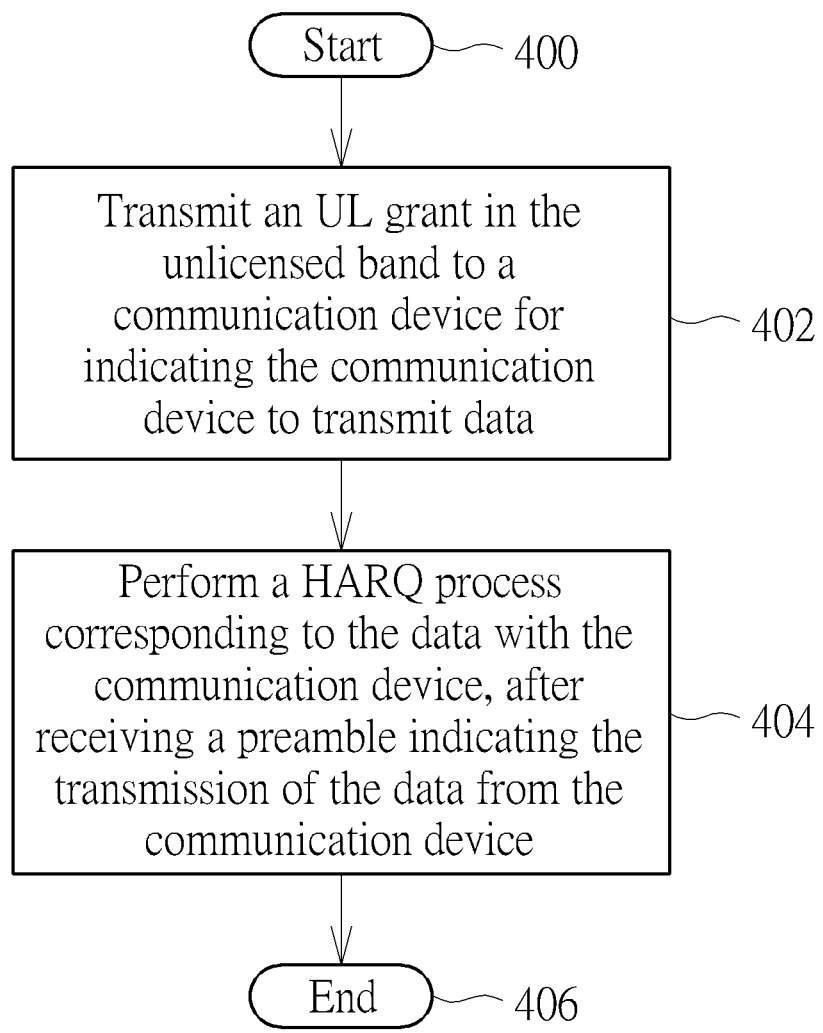
FIG. 4 is a flowchart of a process according to an example of the present invention.

FIG. 4 is a flowchart of a process 40 according to an example of the present invention. The process 40 may be utilized in a network shown in FIG. 1, to handle data transmission in an unlicensed band. The process 40 may be compiled into the program code 214 and includes the following steps:

Step 400: Start.

Step 402: Transmit an UL grant in the unlicensed band to a communication device for indicating the communication device to transmit data.

Step 404: Perform a HARQ process corresponding to the data with the communication device, after receiving a preamble indicating the transmission of the data from the communication device.

Step 406: End.

According to the process 40, the network may transmit an UL grant (e.g., for allocation of resource (time and/or frequency), MCS, etc.)) in the unlicensed band to a communication device for indicating the communication device to transmit data. Then, the network may perform a HARQ process corresponding to the data with the communication device, after receiving a preamble indicating the transmission of the data from the communication device. That is, the network device not only receives the data from the communication device, but also receives the preamble for indicating the transmission of the data. In other words, the network may know (e.g., determine) that the data has been transmitted by the communication device, if the preamble is received (e.g., detected). Thus, the problem that the network is unaware of the transmission of the data from the communication device in the unlicensed band is solved. The network may perform the HARQ process corresponding to the data, if both the data and the preamble are received. As a result, performance of the HARQ process can be improved, and the benefit of the usage of the unlicensed band can be maintained.

Realization of the process 40 is not limited to the above description.

In one example, the network may stop performing the HARQ process, if the preamble is not received. That is, the network may know (e.g., determine) that the data has not been transmitted by the communication device, if the preamble is not received (e.g., detected). Thus, the network may not perform the HARQ process corresponding to the transmission.

In one example, the preamble may further indicate at least one of a channel quality of the unlicensed band and a traffic load of the unlicensed band. It should be noted that the channel quality may include (or simply be) CQI, RSRP, RSRQ and/or RSSI, etc., and is not limited herein.

There are various ways for the network to determine if the preamble is received. In one example, the network may determine that the preamble is received, if the preamble is one of a plurality of predetermined preambles. In another example, a plurality of lengths of the plurality of predetermined preambles may be different. The network may determine that the preamble is received, if the length of the preamble and the length of the one of the plurality of predetermined preambles are the same. That is, a matching may be performed for the received preamble to determine whether the preamble is received.

Figure 5:
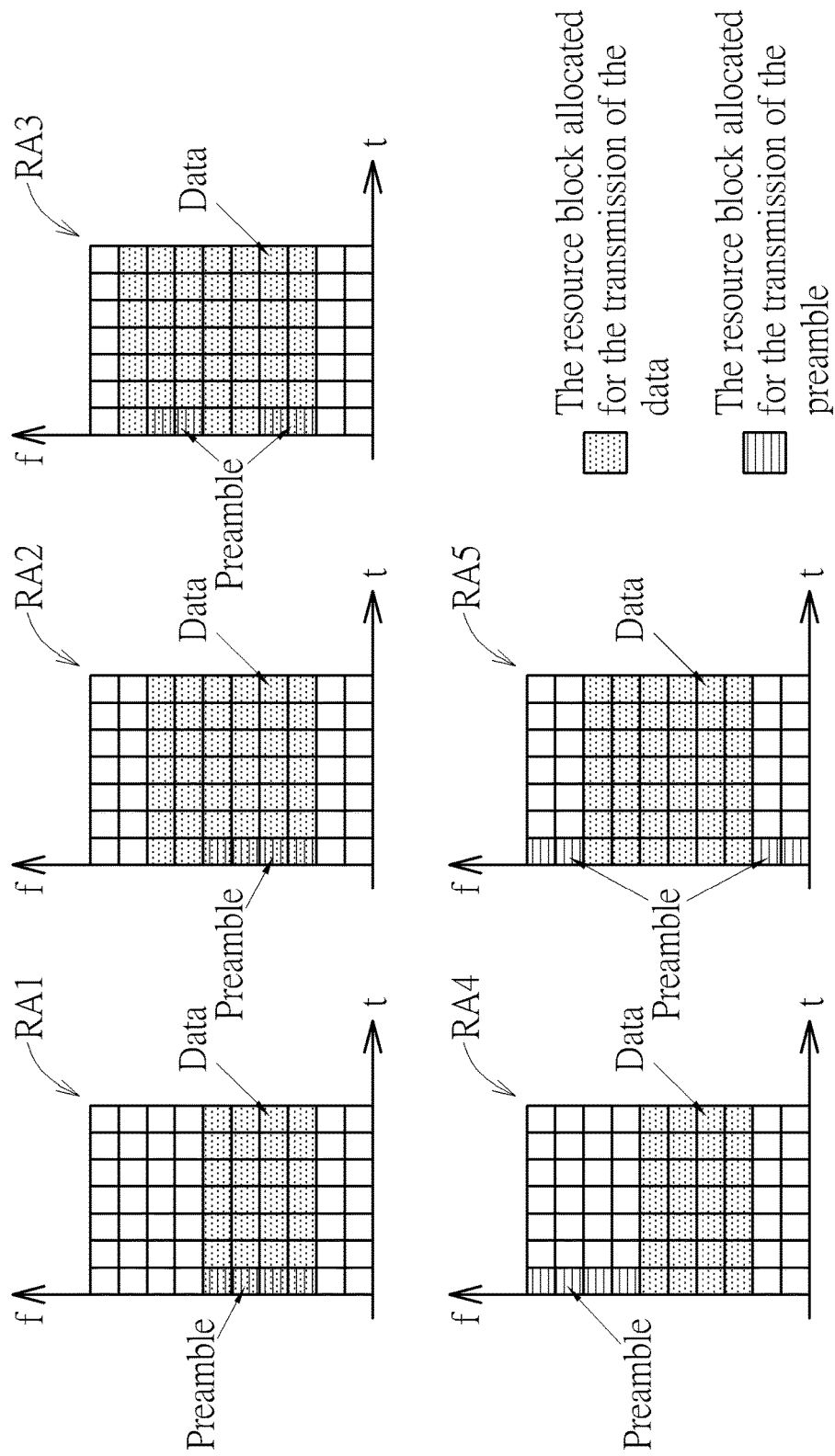
FIG. 5 is a schematic diagram of transmissions of data and a preamble in resource blocks of an unlicensed band according to an example of the present invention.

FIG. 5 is a schematic diagram of transmissions of data and a preamble in resource blocks of an unlicensed band according to an example of the present invention. In FIG. 5, resource allocations RA1-RA5 are used for representing resource blocks allocated to the communication device for the transmissions of the data and the preamble, wherein the resource block includes a plurality of subcarriers of orthogonal frequency-division multiplexing (OFDM) symbol(s). The resource blocks allocated to the communication device for the transmission of the data are represented by dotted squares, the resource blocks allocated to the communication device for the transmission of the preamble are represented by lined squares, and resource blocks that are not used or allocated to the communication device are represented by blank squares. Reference axes such as time (i.e., t) and frequency (i.e., f) are also shown in FIG. 5. In detail, as shown in the resource allocations RA1-RA3, the lined squares are a part of the dotted squares. That is, the resource blocks allocated to the communication device for the transmissions of the data and the preamble are overlapped. As shown in the resource allocations RA4-RA5, the lined squares are not apart of the dotted squares, i.e., the lined squares are not overlapped with the dotted squares. That is, the resource blocks allocated to the communication device for the transmissions of the data and the preamble are separated from each other.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for handling data transmission in an unlicensed band. Thus, the problem that the network is unaware of the transmission of the data from the communication device in the unlicensed band is solved. The network may perform the HARQ process corresponding to the data, if both the data and the preamble are received. As a result, performance of the HARQ process can be improved, and the benefit of the usage of the unlicensed band can be maintained.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling data transmission in an unlicensed band, comprising:
   a storage device; and
   a processing circuit, coupled to the storage device, wherein the storage device stores, and the processing circuit is configured to execute instructions of:
   receiving an uplink (UL) grant in the unlicensed band from a network, wherein the UL grant indicates a first plurality of resource blocks for transmitting data;

transmitting the data in the first plurality of resource blocks of the unlicensed band to the network according to the UL grant; and transmitting a preamble in a second plurality of resource blocks of the unlicensed band to the network, wherein the preamble indicates the transmission of the data;

wherein the preamble further indicates at least one of a channel quality of the unlicensed band and a traffic load of the unlicensed band.

2. The communication device of claim 1, wherein the second plurality of resource blocks are configured by a radio resource control (RRC) message transmitted by the network.

3. The communication device of claim 1, wherein the second plurality of resource blocks are determined according to the UL grant.

4. The communication device of claim 3, wherein the second plurality of resource blocks are determined according to an index of a resource block for receiving the UL grant, or is determined according to a field of the UL grant.

5. The communication device of claim 1, wherein the second plurality of resource blocks are a part of the first plurality of resource blocks, or are not overlapped with the first plurality of resource blocks.

6. The communication device of claim 1, wherein the preamble is multiplied by an orthogonal sequence by the network.

7. The communication device of claim 1, wherein the instructions further comprises:

selecting the preamble from a plurality of predetermined preambles according to at least one of the UL grant, a channel quality of the unlicensed band and a traffic load of the unlicensed band.

8. The communication device of claim 7, wherein the preamble is selected according to an index of a resource block for receiving the UL grant, or is selected according to a field of the UL grant.

9. A network for handling data transmission in an unlicensed band, comprising:

a storage device; and a processing circuit, coupled to the storage device, wherein the storage device stores, and the processing circuit is configured to execute instructions of:

transmitting an uplink (UL) grant in the unlicensed band to a communication device for indicating the communication device to transmit data in a first plurality of resource blocks of the unlicensed band; and performing a hybrid automatic repeat request (HARQ) process corresponding to the data with the communication device, after receiving a preamble from the communication device in a second plurality of resource blocks of the unlicensed band, wherein the preamble indicates the transmission of the data;

wherein the preamble further indicates at least one of a channel quality of the unlicensed band and a traffic load of the unlicensed band.

10. The network of claim 9, wherein the instructions further comprises:

stopping performing the HARQ process, if the preamble is not received.

11. The network of claim 9, wherein the instruction of receiving the preamble comprises:

determining that the preamble is received, if the preamble is one of a plurality of predetermined preambles.

12. The network of claim 11, wherein a plurality of lengths of the plurality of predetermined preambles are different.

13. The network of claim 11, wherein a length of the preamble and a length of the one of the plurality of predetermined preambles are the same.

* * * * *